June 22, 1954  A. W. KLOMP  2,681,596
MACHINE FOR GENERATING MACHINED PATHS ON WORKPIECES
Filed June 2, 1950  2 Sheets-Sheet 2
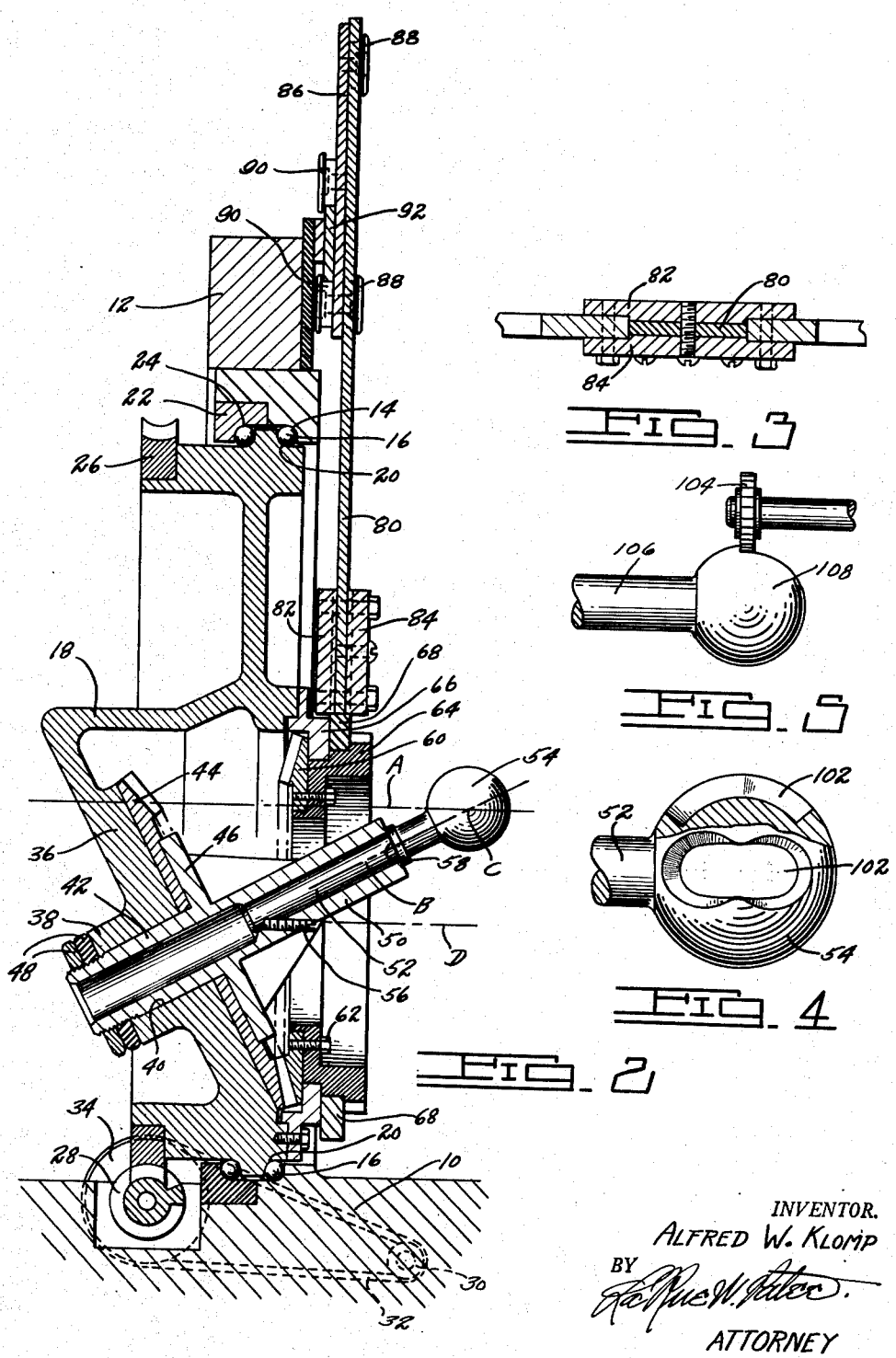
INVENTOR.
ALFRED W. KLOMP
BY
ATTORNEY Patented June 22, 1954

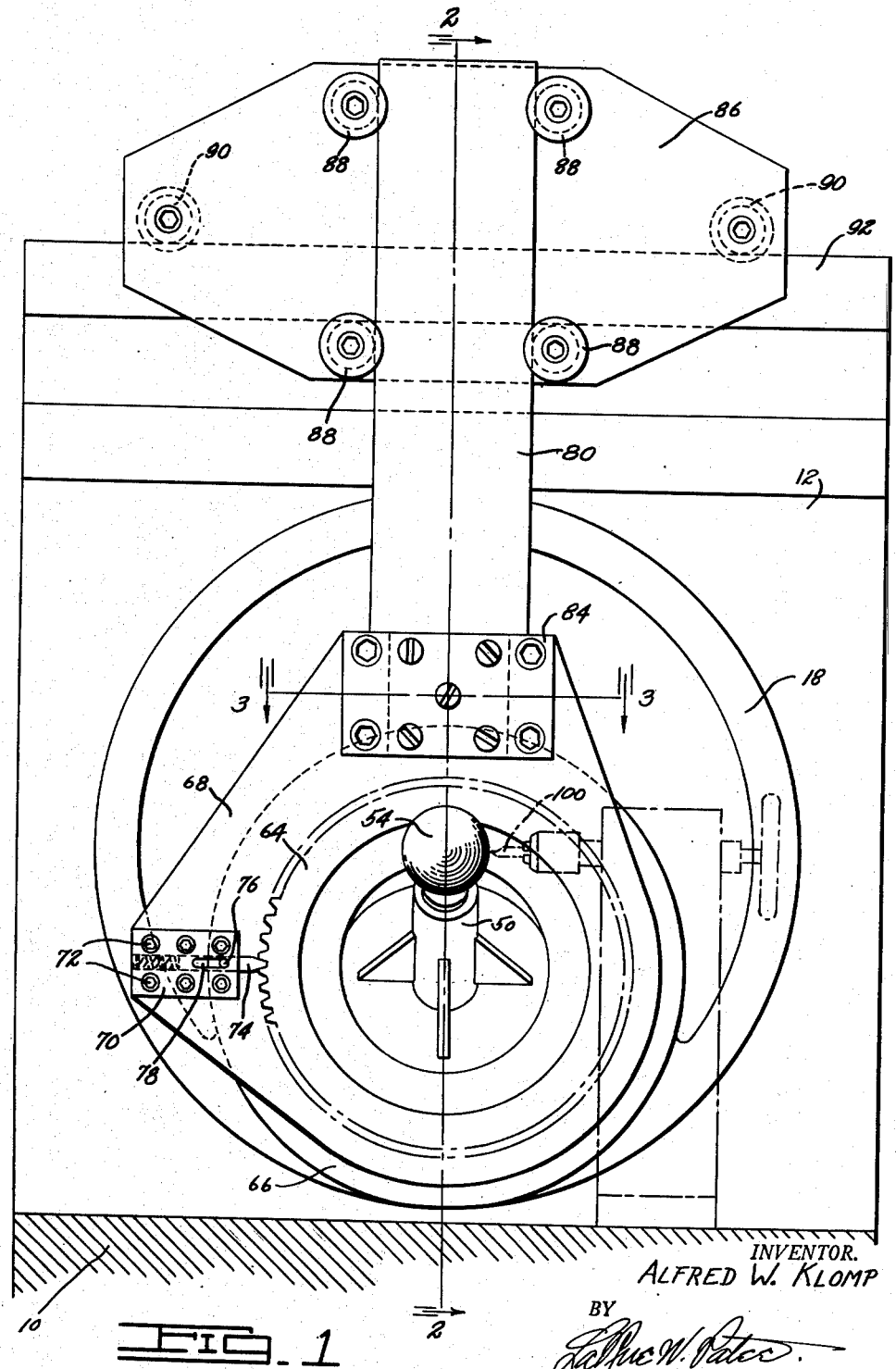

2,681,596

UNITED STATES PATENT OFFICE 2,681,596

MACHINE FOR GENERATING MACHINED PATHS ON WORKPIECES

Alfred W. Klomp, Detroit, Mich., assignor to Process Gear and Machine Company, Detroit, Mich.

Application June 2, 1950, Serial No. 165,805

7 Claims. (Cl. 90—20)

1

This invention relates to a surface generating machine and more particularly to a machine for forming a path in one of inter-connected members. Specifically, the invention is illustrated in a fixture for moving one end of the axis of a part through a circular path with the opposite end of the axis fixed and machining the part by a tool having its axis intersecting the fixed point of the axis of the part.

It has been found in couplings, such as universal joints, that if the parts are so constructed and arranged that the driving connections between the driving and driven members are fixed to one of the members and follow a predetermined path in the other of the members there will be provided a constant velocity universal joint wherein a compensatory movement is provided between the driving and driven members to remove the acceleration and deceleration periods normally present in the conventional universal joint of the fixed pin and bearing type.

The present invention relates to a method and a machine for producing a path in one of the driving or driven members.

It is an object of the present invention to provide means for moving one end of the axis of a member through a circular path about a fixed point on the axis, holding the part against rotation on its axis, and machining a surface of the part by a tool having its axis on a line passing through the fixed point.

Another object of the invention is to provide indexing means for the work support which will position a face of the work for machining in predetermined location and hold the work against rotation during the machining operation.

Other objects and advantages of the invention will more fully appear from the following description taken in connection with the accompanying drawings, in which:

Fig. 1 is a front elevational view of the machine;

Fig. 2 is a cross sectional view taken on line 2—2 of Fig. 1;

Fig. 3 is a cross sectional view taken on line 3—3 of Fig. 1;

Fig. 4 is a fragmentary view of a part, partly in section and elevation, showing the paths on the part machined in accordance with the invention and Fig. 5 is a side elevational view illustrating the cutting tool in a different position for machining a face of the work.

Referring to the drawings, I have shown a machine having a base 10 with a vertical support

2

12. The support 12 is provided with an outer raceway 14 which receives ball bearings 16. A housing 18 is provided with an inner raceway 20 and is rotatably supported on the bearings 16. A locking ring 22 retains the housing 18 in position, there being additional bearings 24, which together with the bearings 16, take radial and thrust loads.

The housing 18 has a ring gear 26 which meshes with a worm 28 rotatably driven by a source of power shown at 30 through belt 32 and pulley 34.

The axis of rotation of the housing 18 is illustrated at A by the dot and dash line. The housing 18 is provided with an offset face portion 36 and a hub 38 having a bore 40 for receiving a shaft 42. The axis of the bore 40 is indicated at B by the dot and dash lines and extends at an angle to intersect the axis A at a point indicated at C. The offset face 36 receives a bevel gear 44 held in place by a flange 46 on the shaft 42. This gear 44 and the flange 46 are secured together by any suitable means for operation in unison. The shaft 42 is held in the hub 38 by lock nuts 48. The shaft 42 has a tubular outer end portion 50 which receives a shank 52 on the work 54, which in illustrated form, is the ball end of a universal joint member. The shank 52 is held in position by a set screw 56. A shoulder 58 on the shank 52 is axially positioned in such a manner that when it abuts the outer end of the tubular portion 50, the ball end 54 has its center exactly at the point C, that is, on the point at the intersection of the axes A and B.

When the housing 18 is rotated about the axis A, the bevel gear 44 and axis B are revolved about the axis A and the point C. However, the structure thus far described would permit the outer surface of the ball 54 to rotate about the axis A. In order to prevent rotation of the ball and work and yet permit its axis to revolve about the axis A, I have provided a bevel gear 60 meshing with the bevel gear 44 rotatable about the axis D. Secured to the bevel gear 60, by screws 62, is an index ring gear 64. A cover plate 66, bolted to the housing 18, holds the bevel gear 60 and ring gear 64 in assembled position.

A plate 68, carried between the ring gear 64 and the cover plate 66, carries a locking means cooperating with the ring gear 64 to prevent relative rotation. This locking means comprises a plate 70 secured to the plate 68 by screws 72 and a spring urged plunger 74 normally positioned between the gear teeth of the ring gear 64. A projection 76, movable in a slot 78, provides a means for retracting the plunger 74 so that the gear 64 may be rotated relative to the plate 68.

The plate 68, during operation, moves about a circle, the center of which is on axis A, but the plate is held against rotation by a vertical slide arm 80 secured to the plate 68 by plates 82 and 84 bolted to the opposite sides of the arm 80 and plate 68, as illustrated in Fig. 3. Since the plate 68 moves in a circle, it is necessary to provide for vertical and horizontal movement of slide arm 80. This has been accomplished by arranging a horizontally movable plate 86 carrying rollers 88 which guide the arm 80 during its vertical movement and rollers 90 which engage a track 92 carried by the support 12.

The above described construction causes the axis B of the work and ball to revolve about the axis A but the work and ball are held against rotation about their own axis B.

A cutting tool is shown in dotted lines at 100 and the axis of this tool is on a line passing through the point C which is the intersection of the axes A and B and the exact center of ball 54. The tool may be rotatably driven and advanced toward and away from the work to accomplish the cutting operation by any suitable means, such as are well known in the cutting tool art.

While I have described the ball as being non-rotatable, it will be understood that the outer surface of the ball is moving in a path which can best be described as a symbol of infinity. Therefore, the tool will cut a path in the ball which is represented by the sign of infinity.

Fig. 4 illustrates a ball after four such paths or recesses 102 have been machined in the ball. This view illustrates four machined faces, the ball having been indexed to the four positions during the machining. The indexing is done by retracting the plunger 74, rotating the ring gear 64 through an arc of 90° relative to the plate 68, locking the plunger 74 to the gear, and machining the face of the ball adjacent the tool. Thus any number of faces may be presented to the tool for machining and any number of paths may be formed on the work and may be equally or unequally spaced circumferentially of the ball.

The illustrated form of workpiece and the path generated has been successfully used in the manufacture of a constant velocity universal joint, wherein fixed bearings in one of driving and driven members are guided in the paths 102 during relative angular movement of the driving and driven members and one rotated by the other.

The angular relation of the axes A and B may be varied depending upon the desired path to be machined in the work.

In Fig. 1 the cutting tool is shown having its axis on a line passing through the center of the ball workpiece. If desired the surface on the ball may be machined by a cutting tool having its axis at one side of the workpiece, as illustrated in Fig. 5, wherein the cutting tool is shown at 104, the workpiece shank at 106 and the ballend at 108.

The embodiment of the invention as herein shown and described is for illustrative purposes and it is to be understood that various changes, including the size, shape and arrangement of parts, may be made without departing from the spirit of my invention and it is not my intention to limit it other than by the terms of the appended claims.

I claim:

1. A machine for generating a path on a workpiece which comprises a support, a member rotatably carried by said support, means for rotating said member, a workpiece carried by said member and having its axis at an angle to and intersecting the axis of rotation of said member, and means for holding the workpiece stationary with respect to its own axis during revolution of the workpiece axis about the axis of said rotatable member.

2. A machine for generating a path on a workpiece which comprises a support, a member rotatably carried by said support, means for rotating said member, a workpiece carried by said member and having its axis at an angle to and intersecting the axis of rotation of said member, means for holding the workpiece stationary relatively to its own axis during revolution of the workpiece axis about the axis of said rotatable member, and a cutting tool having its axis on a line at right angles to the axis of said rotatable member.

3. A machine for generating a path on a workpiece which comprises a support, a carrier rotatably carried by said support, means for rotating said carrier, a first rotatable member having its axis at an angle to the axis of rotation of said carrier and intersecting the latter, a workpiece carried by said first rotatable member having its axis coincident therewith and a portion of the body of said workpiece passing through the axis of said rotatable carrier, a second rotatable member in driving engagement with said first rotatable member and having its axis parallel to the axis of said rotatable carrier, and means for holding the said second rotatable member stationary relatively to its own axis during rotation of said rotatable carrier.

4. A fixture for supporting a workpiece to be machined comprising, a rotatable carrier, a work support carried by said rotatable carrier for positioning the work at an angle to the axis of rotation of said rotatable carrier whereby a portion of the work intersects the axis of said rotatable carrier, means for rotating said rotatable carrier whereby the axis of the work is revolved about the axis of said rotatable carrier, and means for holding the work stationary relatively to its axis, said means being releasable to permit indexing of the work about its axis.

5. A machine for generating a surface on a workpiece which comprises a support, a carrier rotatably carried by said support, means for rotating said carrier, interconnected rotatable members having their axes arranged at an angle to each other, one of said members carrying the workpiece with the axis of the workpiece passing through and intersecting the axis of said rotatable carrier, and indexing means for positioning the workpiece with a surface thereof in a predetermined location with respect to said carrier.

6. A machine for generating a plurality of separate operation paths on the outer surface of a workpiece, including a support, a member rotatably carried by said support, means for rotating said member, means on said member to carry a workpiece with the axis of the workpiece at an angle to and intersecting the axis of rotation of said member, means to hold the workpiece stationary with respect to its own axis during rotation of said member, cutting means adjacent said workpiece, and said holding means being releasable to permit rotation of the workpiece about its axis to index the workpiece for the cutting of another path.

7. A machine for generating a path on a workpiece which comprises a support, a member rotatably carried by said support, means for rotating said member, a workpiece carried by said member and having its axis at an angle to and intersecting the axis of rotation of said member, means for holding the workpiece stationary with respect to its own axis during revolution of the workpiece axis about the axis of said rotatable member, said workpiece having a head portion on which said path is generated, and the intersection points of said axes being at the center of said head portion.

References Cited in the file of this patent

UNITED STATES PATENTS

| Number | Name | Date |
|---|---|---|
| 607,628 | Reece | July 19, 1898 |
| 1,499,818 | Franconetti | July 1, 1924 |
| 2,335,995 | Brown | Dec. 7, 1943 |
| 2,426,925 | Ellis | Sept. 2, 1947 |